(12) United States Patent
Mesaki

(10) Patent No.: US 6,722,794 B2
(45) Date of Patent: Apr. 20, 2004

(54) OPTICAL MODULE AND OPTICAL MODULE PRODUCING METHOD

(75) Inventor: Akitoshi Mesaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 09/988,250

(22) Filed: Nov. 19, 2001

(65) Prior Publication Data

US 2002/0159720 A1 Oct. 31, 2002

(30) Foreign Application Priority Data

Apr. 27, 2001 (JP) ........................................ 2001-133675

(51) Int. Cl.$^7$ .............................. G02B 6/36; G02B 6/42
(52) U.S. Cl. ........................................... 385/92; 385/94
(58) Field of Search ................................... 385/88–94

(56) References Cited

U.S. PATENT DOCUMENTS 5,940,561 A * 8/1999 Dean et al. ................... 385/60
6,181,854 B1 * 1/2001 Kojima et al. ................ 385/49
6,293,711 B1 * 9/2001 Sasaki .......................... 385/88

FOREIGN PATENT DOCUMENTS

| JP | 61-213807 | 9/1986 |
| JP | 64-32210 | 2/1989 |
| JP | 11-186609 | 7/1999 |
| JP | 11-264920 | 9/1999 |

* cited by examiner

Primary Examiner—Hemang Sanghavi
Assistant Examiner—Omar Rojas
(74) Attorney, Agent, or Firm—Staas & Halsey LLP

(57) ABSTRACT

An optical module is provided with a ferrule an optical fiber which penetrates a center thereof along an axis direction of the ferrule, a member inserted with the ferrule, a sealed container connected to the member and having an optical system which optically couples to the optical fiber, and a resin portion encapsulating the member and the sealed container. A communication path includes a first communication passage between the ferrule and the member, a space where the optical system and the optical fiber confront each other, and a second communication passage between the ferrule and the member, where the first and second communication passages are mutually independent.

5 Claims, 14 Drawing Sheets

OPTICAL MODULE AND OPTICAL MODULE PRODUCING METHOD

BACKGROUND OF THE INVENTION

This application claims the benefit of a Japanese Patent Application No. 2001-133675 filed Apr. 27, 2001, in the Japanese Patent Office, the disclosure of which is hereby incorporated by reference.

1. Field of the Invention

The present invention generally relates to optical modules and optical module producing methods, and more particularly to an optical module, having an optical connector, which is detachably and optically coupled and is covered by a molded resin for protection at the time of production, and to an optical module producing method for producing such an optical module.

2. Description of the Related Art

In optical communication apparatuses and information processing apparatuses which process optical signals, there are demands to realize a high-density optical signal transmission at a high speed and a high capacity. On the other hand, there are also demands to reduce the size and cost and to simplify the structure of a transmitter section and a receiver section of a terminal equipment which transmits and receives the optical signal. Hence, there are similar demands with respect to various kinds of optical modules.

In the optical module which is coupled to an optical fiber of the transmission line, it is desirable that the optical module is detachably connected directly by an optical connector. Hence, the so-called pig-tail type optical module, which has the optical connector at a tip end of an optical fiber having a suitable length, is popularly used. However, the provision of the optical fiber introduces various problems.

For example, when assembling the optical module by an automatic assembling process, the provision of the optical fiber interferes with the full automation of the assembling process. In addition, when transporting the optical module, it is necessary to accommodate the optical module within a transporting case and to handle the optical module with care. Furthermore, when mounting a main body of the optical module within an apparatus, it is necessary to take appropriate measures such as mounting the optical fiber by winding the optical fiber to a predetermined diameter.

In view of the above, it is possible to effectively reduce the size of the optical module, by providing an optical connector section without via an optical fiber, as shown in a cross sectional view of FIG. 1.

An optical module 1 has a projecting ferrule 2, for an optical connector, provided with an optical fiber at a central portion on a tip end portion on the left side of the optical module 1 in FIG. 1. The periphery of the ferrule 2 fits in a first cylindrical member 3, and the periphery of the first cylindrical member 3 fits in a second cylindrical member 4. An end surface of the second cylindrical member 4 is connected to an end surface of an optical device 5 which is made of a sealed container. An optical element, such as a laser diode which is used as a light emitting element, is provided within the optical device 5.

A plurality of terminals 6 for connecting to electrical circuits is provided on the right side of the optical device 5 in FIG. 1. The terminals 6 are connected to a circuit board 7 having various electrical circuits. Terminals 8 for connecting to an external circuit are provided on both sides of the circuit board 7.

A synthetic resin molded portion 9 covers, that is, encapsulates, the periphery of the optical module 1, excluding the tip end portion of the ferrule 2 and the ends of the terminals 8, to form the optical module 1.

The synthetic resin molded portion 9 has an engaging part 11 which projects on both sides in a direction perpendicular to an axis direction of the ferrule 2 and the first cylindrical member 3. The engaging part 11 includes a sloping surface 12 located on a left side in FIG. 1, an engaging surface 13 perpendicular to the axis direction located on the right of the sloping surface 12, a flat guide portion 14 located on the left of the sloping surface 12, and a constricted portion 15 located on the right of the engaging surface 13. These elements of the engaging part 11 form a connector section 16 of the optical module 1.

In FIG. 1, the cross section of the synthetic resin molded portion 9 is shown along the solid line to facilitate understanding of the positional relationship of the optical device 5 and the circuit board 7.

FIGS. 2A and 2B respectively show a plan view and a cross sectional view of an optical connector 21 of an optical fiber cord which forms an optical fiber transmission line that connected to the optical module 1. In the optical connector 21, a cylindrically coiled spring 24 having a slit 23 in the axis direction, and also referred to as a split sleeve, is fit into a central penetration hole in a synthetic resin molded housing 22. A ferrule 25 is press-fit within the cylindrically coiled spring 24 so as to push and spread the diameter of the cylindrically coiled spring 24.

A holder 26 is press-fit and connected to the left side of the ferrule 25 in FIGS. 2A and 2B. An optical fiber cord 27 is fixed to the holder 26. In addition, the optical fiber of the optical fiber cord 27 penetrates the center of the ferrule 25 and is connected to the ferrule 25. The end of the optical fiber is exposed at the end portion of the ferrule 25, and is optically polished.

A compressed coil spring 28 is inserted between the housing 22 and the holder 26. The compressed coil spring 28, together with the holder 26, pushes against the ferrule 25 and urges the ferrule 25 towards the rightward direction in FIGS. 2A and 2B.

A pair of engaging leaf springs 31 which project towards the axis direction are provided in parallel on the right side of the housing 22 in FIGS. 2A and 2B. Each engaging leaf spring 31 has an engaging projection 32 on a tip end thereof, and a guide portion 33 on an inner side of the engaging projection 32. The engaging projections 32 of the pair of engaging leaf springs 31 confront each other, and the guide portions 33 of the pair of engaging leaf springs 31 confront each other.

A sloping surface 34 and an engaging surface 35 which is perpendicular to the axis direction are formed on the tip end of the engaging projection 32. The engaging projection 32 and the guide portion 33 are separated by an intermediate space or gap which extends in a direction perpendicular to the paper in FIGS. 2A and 2B.

The optical connector 21 is known as an EZ type optical connector, and the diameter of the ferrule 25 is 1.25 mm. The housing 22 is made of a synthetic resin having mechanical resilience. The cylindrically coiled spring 24 is made of a resilient material such as zirconia ceramics or metal. The ferrule 25 is made of zirconia ceramics. The holder 26 is made of a molded synthetic resin, and the compressed coil spring 28 is made of a known metal coil.

When optically connecting the optical module 1 and the optical connector 21, the engaging projection 32 of the optical connector 21 is fit over the connector section 16 of the optical module 1, as shown in FIG. 3A which shows the optical connector 21 in cross section.

In other words, the optical connector 21 is pushed so that the guide portions 14 fit into the intermediate spaces of the upper and lower engaging projections 32. Hence, the sloping surfaces 12 and 34 contact each other, and the engaging leaf springs 31 of the optical connector 21 are spread on both sides against the spring force by this contact. As a result, the engaging projections 32 fit into the constricted portions 15 of the connector section 16 as shown in FIG. 3B, and the engaging leaf springs 31 are restored to their original states by the spring force.

During the above process, the tip end of the ferrule 2 fits into the cylindrically coiled spring 24 against the spring force of the cylindrically coiled spring 24. Hence, the tip end of the ferrule 2 is positioned to the central position of the cylindrically coiled spring 24, and the center of the tip end of the ferrule 2 matches the center of the tip end of the ferrule 25 of the optical connector 21. Furthermore, since the tip end of the ferrule 2 moves while compressing the compressed coil spring 28, the tip end of the ferrule 25 is pushed against the tip end of the ferrule 2 by the action of the compressed coil spring 28, to thereby realize a positive optical connection between the ferrules 2 and 25.

In addition, the guide portions 14 of the optical module 1 and the guide portions 33 of the optical connector 21 engage each other to maintain the optical module 1 and the optical connector 21 in a stable connected position. The engaging surfaces 35 of the optical connector 21 contact and engage the engaging surfaces 13 of the optical module 1, so as to positively prevent the optical module 1 and the optical connector 21 from slipping off from each other, and to provide the required optical coupling.

When disconnecting the optical module 1 and the optical connector 21, the engaging projection 32 on the tip ends of the engaging leaf springs 31 are spread with respect to the connector section 16 of the optical module 1, and the optical connector 21 is then pulled from the optical module 1. Since the optical connector 21 is small, the engaging leaf springs 31 are spread by use of an exclusive spreading jig.

Next, a description will be given of the method of assembling the ferrule 2 and the optical device 5 of the optical module 1, by referring to FIG. 4 which shows a cross section of these elements. In FIG. 4, the first cylindrical member 3 is press-fit and positioned on the periphery of the ferrule 2, and the second cylindrical member 4 is fit on the periphery of the first cylindrical member 3.

The end surface of the second cylindrical member 4 contacts and connects to the end surface of a sealed container of the optical device 5. A laser diode (LD, not shown) is provided as an optical element at a central bottom portion on the right end of the sealed container of the optical device 5. A light transmitting window is provided in the sealed container of the optical device 5 at a position confronting the optical fiber 36 which is provided at the center of the ferrule 2. A spherical lens 37 which forms a light transmitting optical system is mounted at the light transmitting window maintaining the sealed state of the sealed container of the optical device 5.

When assembling each of the above described elements, the second cylindrical member 4 and the first cylindrical member 3 are positioned along the axis direction so that the relative positional relationship via the spherical lens 37 optically match between the laser diode mounted on the sealed container of the optical device 5 and the end surface of the optical fiber 36 of the ferrule 2. In addition, the end surface of the second cylindrical member 4 and the end surface of the sealed container of the optical device 5 are positioned and fixed.

The above described positioning is made while measuring the optical output of the laser diode as the output from the optical fiber 36, so that the measured output becomes a maximum. In this state, a contact portion 38 between the first cylindrical member 3 and the second cylindrical member 4 and a contact portion 39 between the second cylindrical member 4 and the sealed container of the optical device 5 are welded by irradiating a welding laser beam from a plurality of symmetrical surrounding locations with respect to the center axis and instantaneously fixed with a satisfactory precision, without introducing positional error.

Thereafter, the circuit board 7 is connected to the above described assembled elements and placed in a cavity within a mold having a predetermined shape, so that the tip end of the ferrule 2 and the tip ends of the terminals 8 project by predetermined distances from the cavity. A synthetic resin such as an epoxy resin in a melted state is supplied into the cavity of the mold, and the synthetic resin molded portion 9 shown in FIG. 1 is removed from the mold after curing.

As shown in FIG. 1, the synthetic resin molded portion 9 covers the periphery of the first cylindrical member 3, the second cylindrical member 4 and the optical device 5, including the periphery of the ferrule 2. But when the melted synthetic resin is supplied into the cavity of the mold, volatile gas is generated from the melted synthetic resin which is at a temperature of 180° C. and is in a high pressure state. This volatile gas enters into a minute gap between the first cylindrical member 3 and the second cylindrical member 4, a minute gap between the second cylindrical member 4 and the sealed container of the optical device 5, and a space between the ferrule 2 and the spherical lens 37 which confront each other.

When the synthetic resin molded portion 9 is removed from the mold, the volatile gas solidifies and forms a thin film on the surfaces of the optical fiber 36 and the spherical lens 37. An optical coupling loss occurs when such a thin film is formed, and consequently, a desired optical characteristic cannot be obtained.

SUMMARY OF THE INVENTION

Accordingly, it is a general object of the present invention to provide a novel and useful optical module and optical module producing method, in which the problems described above are eliminated.

Another and more specific object of the present invention is to provide an optical module and an optical module producing method, which can protect an optical coupling part so that the problems described above are eliminated, and a desired optical characteristic can be obtained.

Still another object of the present invention is to provide an optical module comprising a ferrule an optical fiber which penetrates a center thereof along an axis direction of the ferrule; a member inserted with the ferrule; a sealed container, connected to the member, having an optical system which optically couples to the optical fiber; a resin portion encapsulating the member and the sealed container; and a communication path including a first communication passage between the ferrule and the member, a space where the optical system and the optical fiber confront each other, and a second communication passage between the ferrule and the member, where the first and second communication passages are mutually independent. According to the optical module of the present invention, it is possible to use the communication path to supply a gas when molding the resin portion, so that fine particles of a volatile gas generated from the melted resin are prevented from adhering to the optical fiber and the optical system and forming a film when the volatile gas solidifies. For this reason, it is possible to prevent deterioration of the optical coupling between the optical fiber and the optical system, and the optical coupling part of the optical module is positively protected.

In the optical module, the first and second communication passages may be provided in at least one of the ferrule and the member.

A further object of the present invention is to provide an optical module producing method for producing an optical module which is provided with a ferrule an optical fiber which penetrates a center thereof along an axis direction of the ferrule, a member inserted with the ferrule, a sealed container connected to the member and having an optical system which optically couples to the optical fiber, a resin portion encapsulating the member and the sealed container, and a communication path including a first communication passage between the ferrule and the member, a space where the optical system and the optical fiber confront each other, and a second communication passage between the ferrule and the member, where the first and second communication passages are mutually independent and the optical module producing method comprises the step of (a) placing at least the ferrule and the member within a mold; and (b) supplying a gas to the first communication passage and exhausting the gas from the second communication passage when supplying melted resin into the mold to form the resin portion. According to the optical module producing method of the present invention, it is possible to use the communication path to supply a gas when molding the resin portion, so that fine particles of a volatile gas generated from the melted resin are prevented from adhering to the optical fiber and the optical system and forming a film when the volatile gas solidifies. For this reason, it is possible to prevent deterioration of the optical coupling between the optical fiber and the optical system, and the optical coupling part of the optical module is positively protected.

In the optical module producing method, the step (b) may supply pressurized dry air to the first communication passage.

Other objects and further features of the present invention will be apparent from the following detailed description when read in conjunction with the accompanying drawings.

DESCRIPTION OF THE PREFERRED EMBODIMENTS

Figure 1:
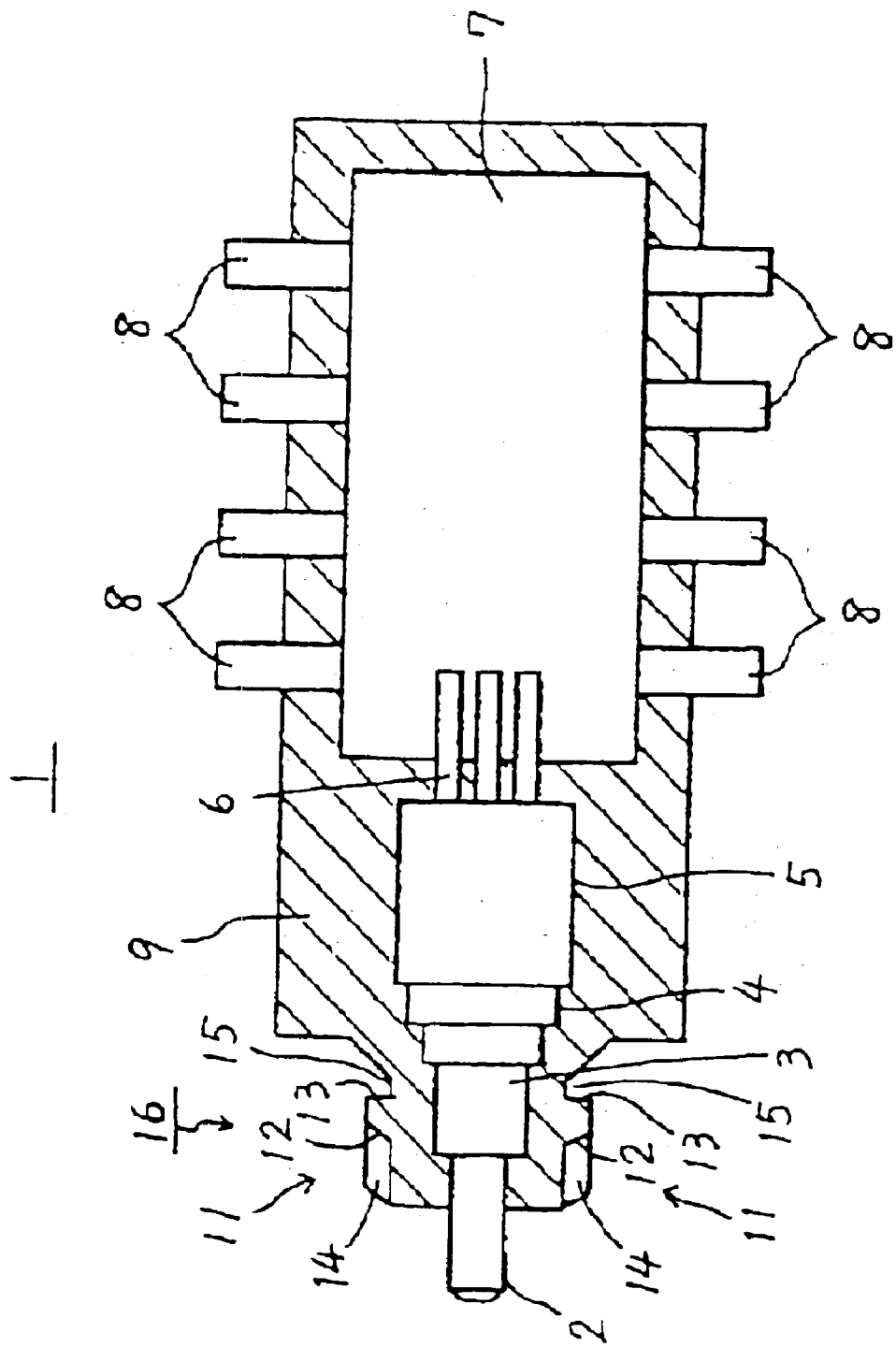
FIG. 1 is a cross sectional view showing an optical module.
Figure 2A:
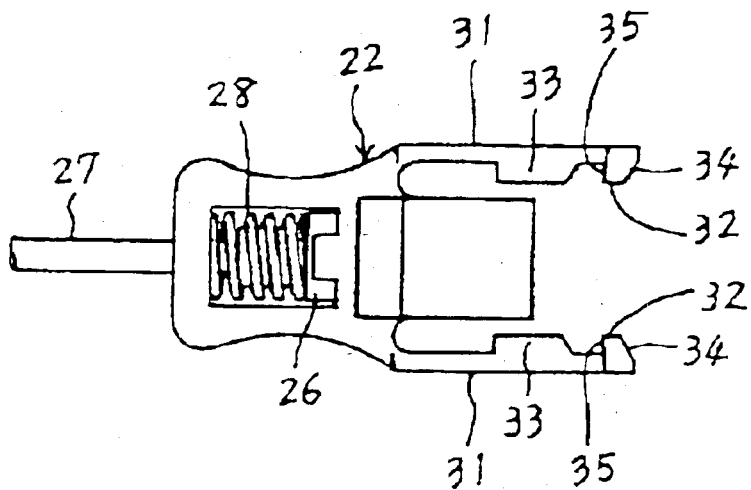
FIGS. 2A and 2B respectively are a plan view and a cross sectional view of an optical connector.
Figure 2B:
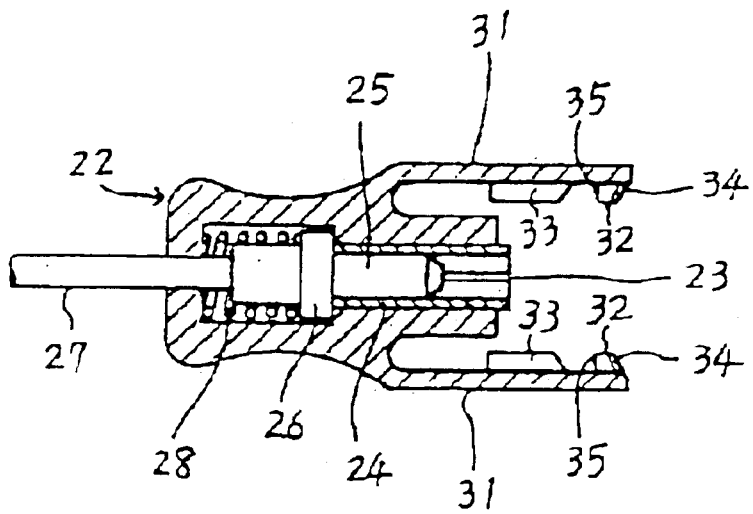
Figure 3A:
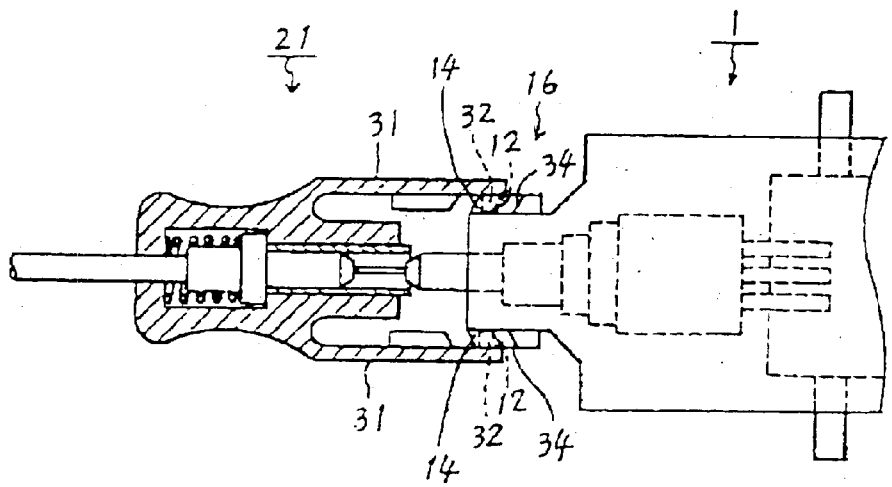
FIGS. 3A and 3B respectively are diagrams for explaining a connection of the optical module and the optical connector, with the optical connector shown in cross section.
Figure 3B:
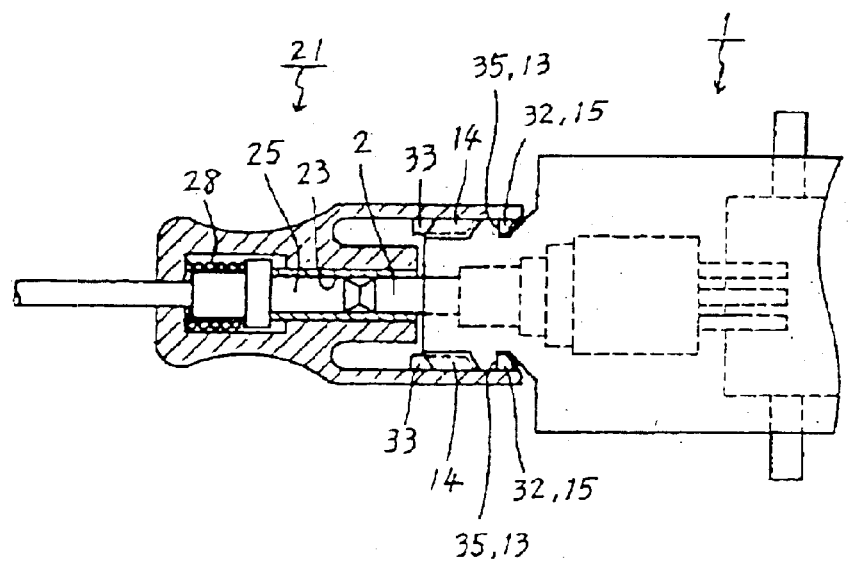
Figure 4:
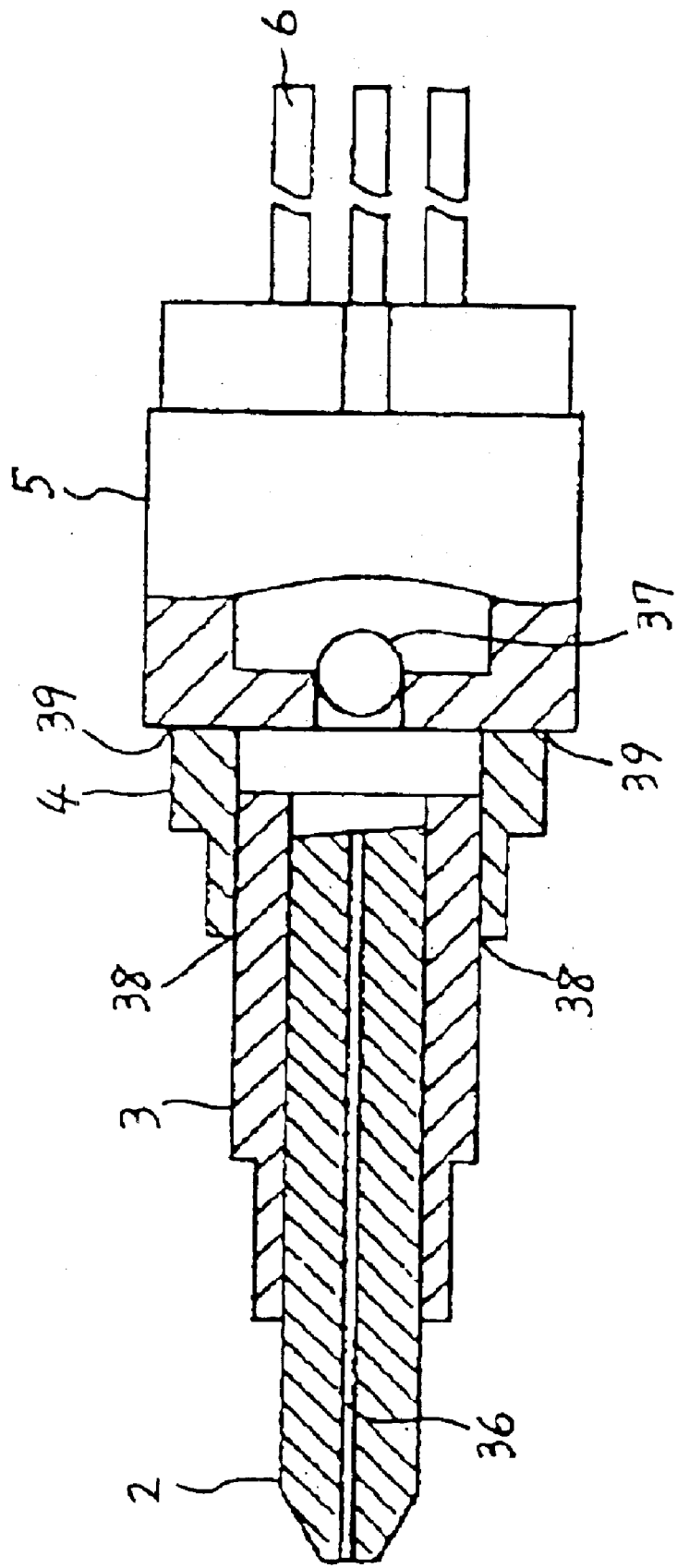
FIG. 4 is a cross sectional view for explaining assembling of a ferrule and an optical device.

Various embodiments of the present invention will now be described with reference to FIGS. 5A through 14. In FIGS. 5A through 14 and FIGS. 1 through 4, the same parts are designated by the same reference numerals.

Figure 5A:
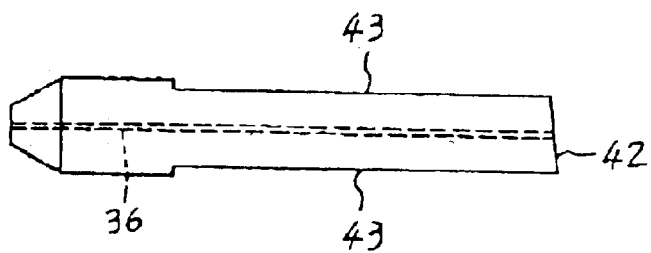
FIGS. 5A, 5B and 5C respectively are a side view, an end view and a plan view showing ferrule of a first embodiment of an optical module according to the present invention.
Figure 5B:
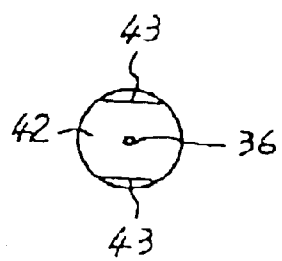
Figure 5C:
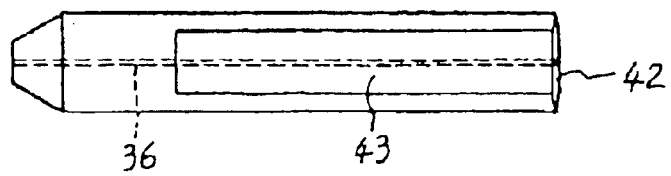

FIGS. 5A, 5B and 5C respectively are a side view, an end view and a plan view showing ferrule of a first embodiment of an optical module according to the present invention. More particularly, FIG. 5B shows the end view of a ferrule 41 shown in FIG. 5A, and FIG. 5C shows the plan view of the ferrule 41 shown in FIG. 5A. The ferrule 41 has a cylindrical shape and is made of zirconia ceramics. An optical fiber 36 penetrates the ferrule 41 in an axis direction thereof, and end surfaces of the optical fiber 36 are exposed at respective end surfaces of the ferrule 41, as shown in FIGS. 5A and 5C. A pair of flat surfaces 43 are provided at symmetrical positions on both sides of the ferrule 41, between an end surface 42 on the inner side of the ferrule 41 and an intermediate position towards a tip end on the outer side of the ferrule 41, as shown in FIGS. 5A and 5B.

Figure 6:
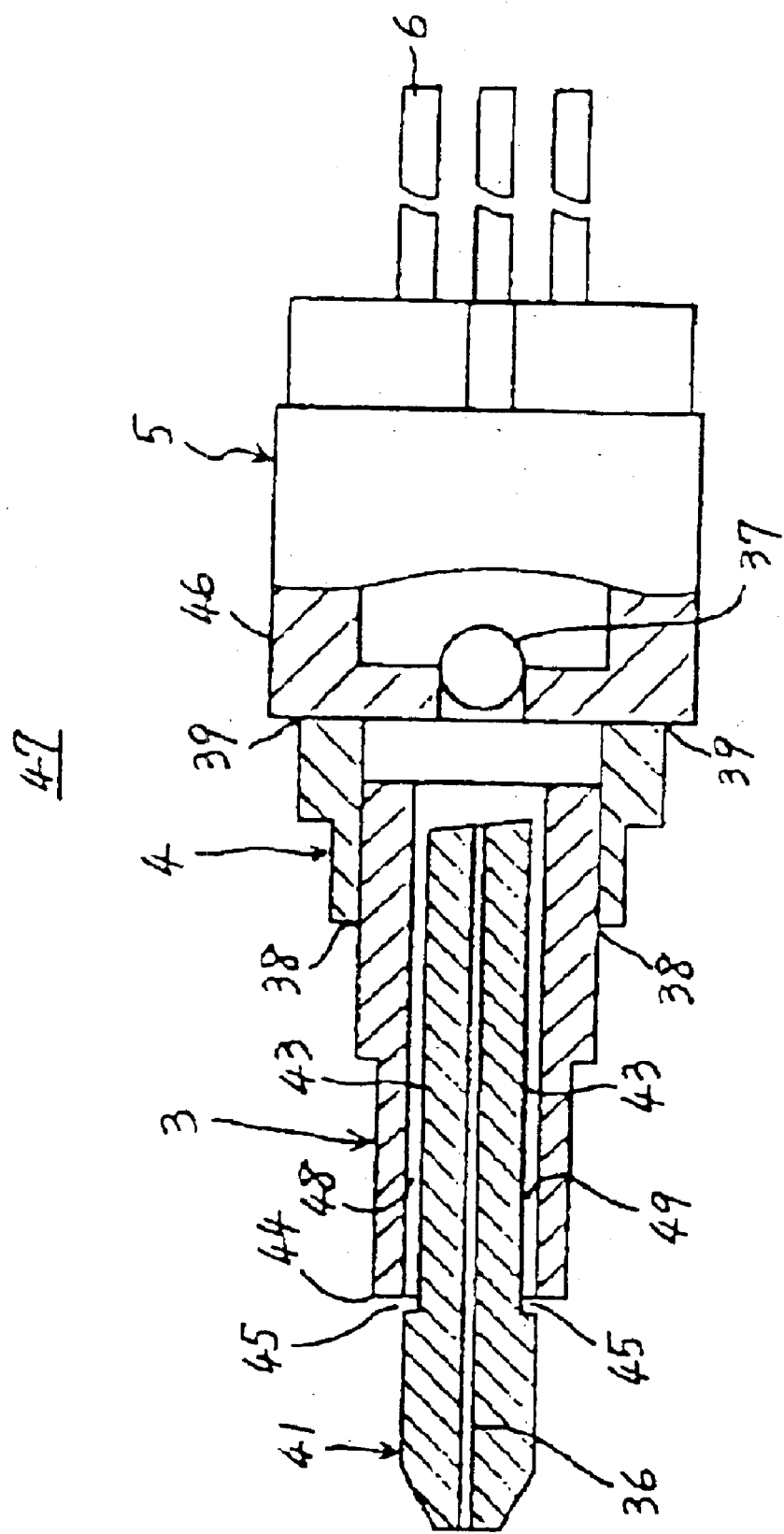
FIG. 6 is a cross sectional view for explaining assembling of the ferrule shown in FIGS. 5A through 5C and an optical device.

FIG. 6 is a cross sectional view for explaining assembling of the ferrule 41 shown in FIGS. 5A through 5C and an optical device 5. When assembling the ferrule 41 and the optical device 5, a first cylindrical member 3 is press-fit around the periphery of the ferrule 41 as shown in FIG. 6, and is positioned so that a slight and appropriate gap 45 is formed between a tip end of each flat surface 43 and a tip end surface 44 of the first cylindrical member 3. A second cylindrical member 4 is fit around the periphery of the first cylindrical member 3.

The end surface of the second cylindrical member 4 contacts and connects to the end surface of a sealed container 46 of the optical device 5. A laser diode (LD, not shown) is provided as an optical element at a central bottom portion on the right end of the sealed container 46 in FIG. 6. A light transmitting window is provided in the sealed container 46 at a position confronting the optical fiber 36 which is provided at the center of the ferrule 41. A spherical lens 37 which forms a light transmitting optical system is mounted at the light transmitting window maintaining the sealed state of the sealed container 46 of the optical device 5.

When assembling each of the above described elements, the second cylindrical member 4 and the first cylindrical member 3 are positioned along the axis direction so that the relative positional relationship via the spherical lens 37 optically match between the laser diode mounted on the sealed container 46 of the optical device 5 and the end surface of the optical fiber 36 of the ferrule 41. In addition, the contact position where the end surface of the second cylindrical member 4 contacts the end surface of the sealed container 46 of the optical device 5 is adjusted in a vertical direction in FIG. 6, and the second cylindrical member 4 and the sealed container 46 are fixed at this adjusted positioned.

The above described positioning is made while measuring the optical output of the laser diode as the output from the optical fiber 36, so that the measured output becomes over a predetermined power. In this state, a contact portion 38 between the first cylindrical member 3 and the second cylindrical member 4 and a contact portion 39 between the second cylindrical member 4 and the sealed container 46 of the optical device 5 are welded by irradiating a welding laser beam from a plurality of symmetrical surrounding locations with respect to the center axis and instantaneously fixed with a satisfactory precision, without introducing positional error.

As a result, an assembly 47 shown in FIG. 6 is obtained. In this assembly 47, independent communication passages 48 and 49, which are closed by the flat surfaces 43, are formed in an axis direction at symmetrical positions, between the periphery of the ferrule 41 and the inner surface of the first cylindrical member 3. A communication path which extends from one tip end surface 44 of the first cylindrical member 3 to the other tip end surface of the first cylindrical member 4 via a space between the optical fiber 36 and the spherical lens 37 which confront each other, is formed via the communication passages 48 and 49.

Thereafter, the circuit board 7 is electrically connected to the above described assembly 47, and the assembly 47 is placed in a cavity within a mold 51, as will be described later in conjunction with FIGS. 7 and 8.

Figure 7:
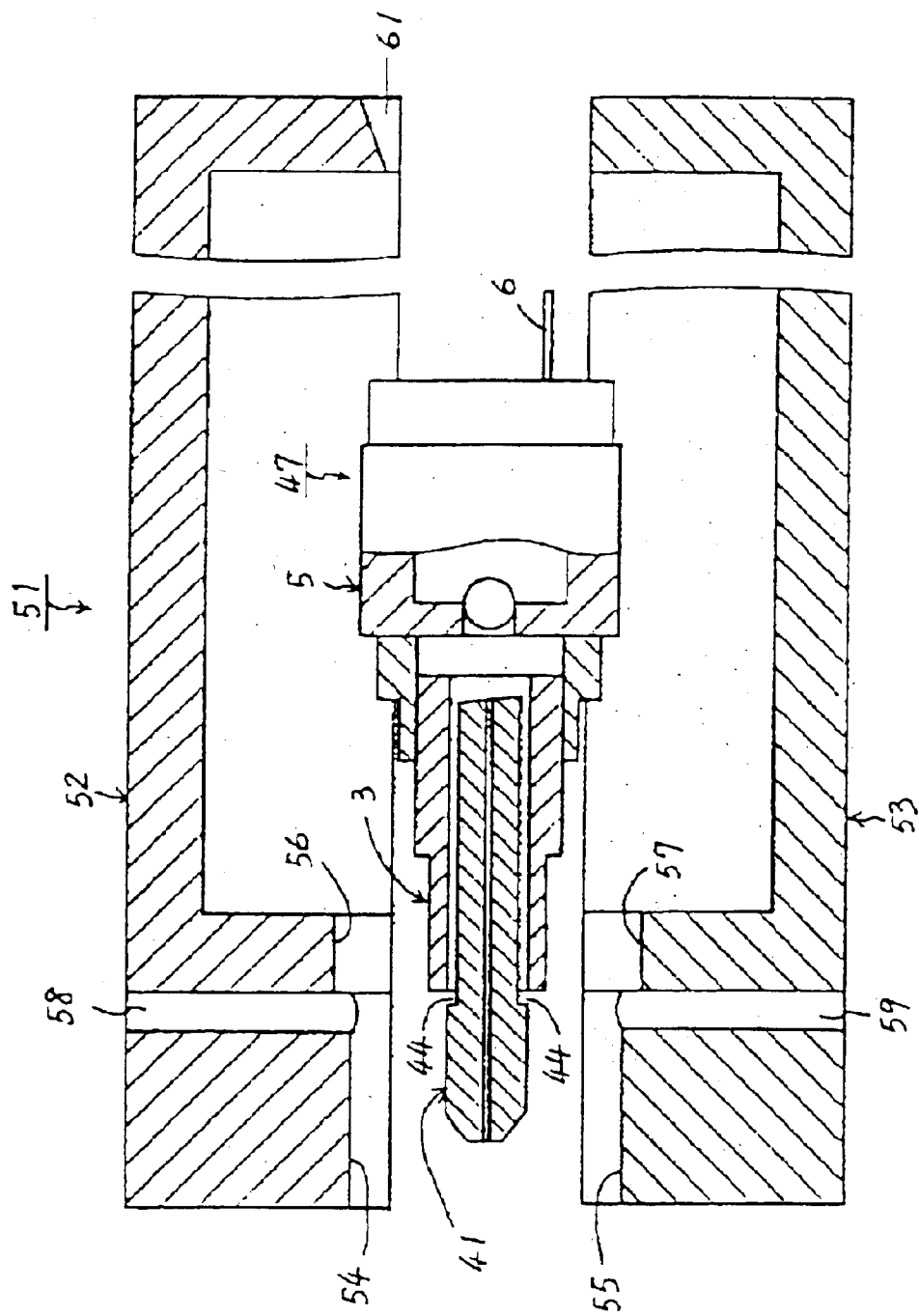
FIG. 7 is a cross sectional view for explaining a relationship between an assembly of the ferrule and the optical device shown in FIG. 6 and a mold.

FIG. 7 is a cross sectional view for explaining a relationship between the assembly 47 of the ferrule 41 and the optical device 5 shown in FIG. 6 and the mold 51. FIG. 7 shows the mold 51 in a state where an upper die 52 and a lower die 53 are separated. The assembly 47 of the ferrule 41 and the optical device 5 is positioned at an intermediate part between the upper and lower dies 52 and 53. The illustration of detailed structures of the mold 51 is omitted in FIG. 7, and only important parts of the mold 51 directly related to the subject matter of the present invention are shown in FIG. 7. Similarly, the illustration of the circuit board 7 is omitted with respect to the assembly 47 in FIG. 7 in order to simplify the drawing.

Semicircular portions 54 and 55 for closely holding the ferrule 41 are respectively provided at the left side of the upper and lower dies 52 and 53 in FIG. 7. Semicircular portions 56 and 57 for closely holding the first cylindrical member 3 are respectively provided in the upper and lower dies 52 and 53, next to the corresponding semicircular portions 52 and 53.

A penetrating hole 58 which vertically and linearly penetrates the semicircular portion 54, on the side of the ferrule 41, is formed in the upper die 52 at a boundary portion between the adjacent semicircular portions 54 and 56. In addition, a penetrating hole 59 which vertically and linearly penetrates the semicircular portion 55, on the side of the ferrule 41, is formed in the lower die 53 at a boundary portion between the adjacent semicircular portions 55 and 57. A cutout portion 61 for supplying the melted resin is provided at the right side of the upper die 52.

Figure 8:
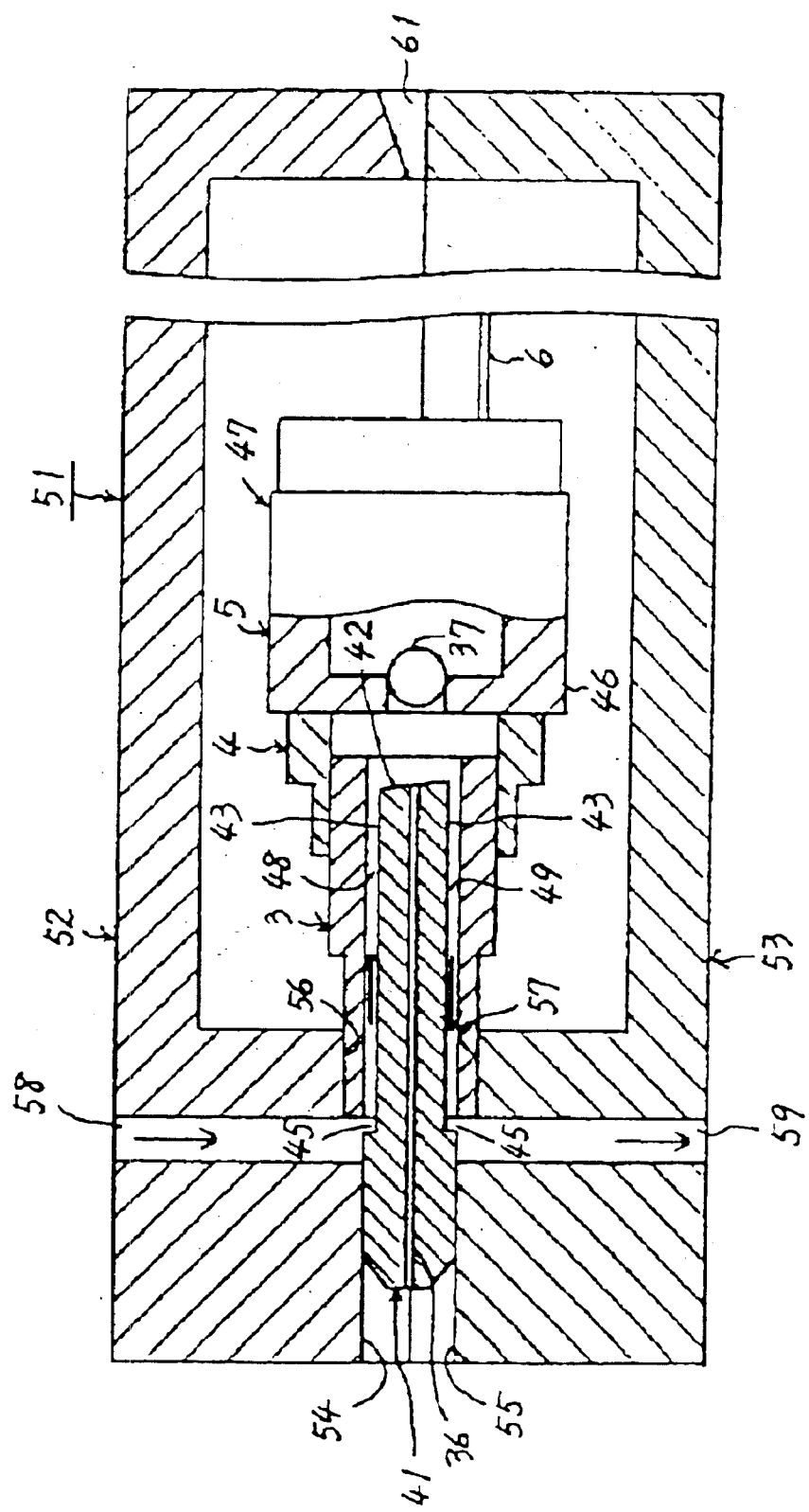
FIG. 8 is a cross sectional view for explaining a relationship between an assembly of the ferrule and the optical device shown in FIG. 6 and a mold.

FIG. 8 is a cross sectional view for explaining a relationship between the assembly 47 of the ferrule 41 and the optical device 5 shown in FIG. 6 and the mold 51. FIG. 8 shows the mold 51 in a state where the upper and lower dies 52 and 53 are connected. In this state, the periphery of the tip end portion of the first cylindrical member 3 is surrounded and supported by the surfaces of the semicircular portion 56 of the upper die 52 and the semicircular portion 57 of the lower die 53. Moreover, the periphery of the ferrule 41 is surrounded and supported by the surfaces of the semicircular portion 54 of the upper die 52 and the semicircular portion 55 of the lower die 53. But in this state, the gaps 45 where the communication passages 48 and 49 which are defined by the flat surfaces 43 open, communicate with the corresponding penetration holes 58 and 59.

Figure 9:
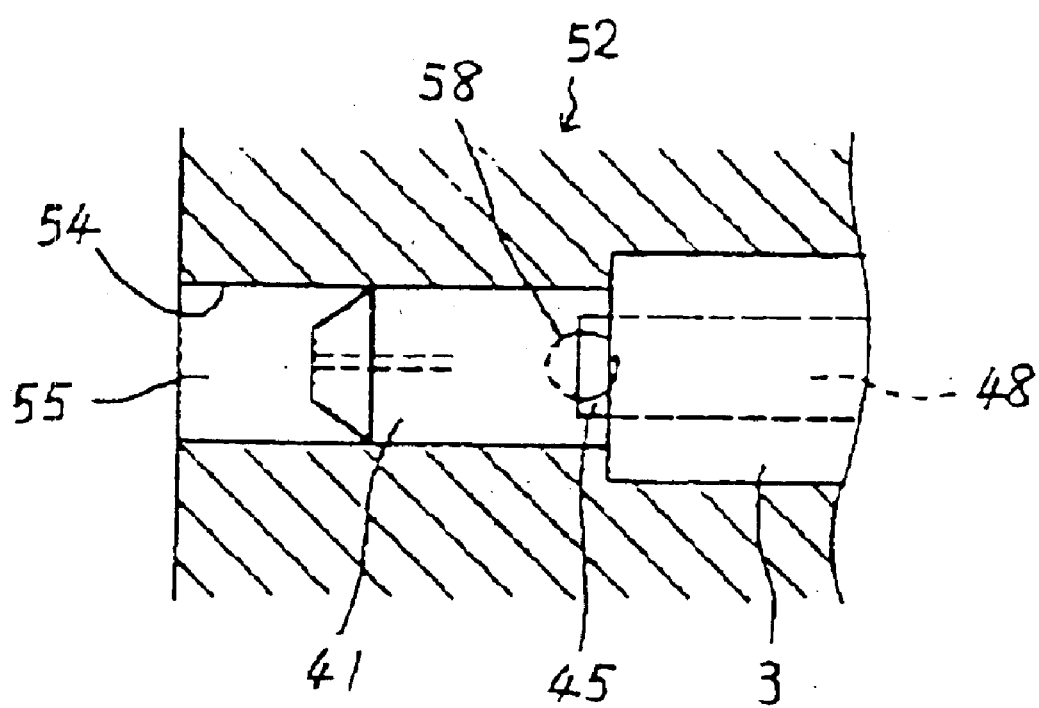
FIG. 9 is a cross sectional view of an important part shown in FIG. 8.

FIG. 9 is a cross sectional view of an important part shown in FIG. 8 in this state. More particularly, FIG. 8 shows the cross section of the upper die 52 in a vicinity of the joint between the upper and lower dies 52 and 53, with the penetration hole 58 indicated by a two-dot chain line. It may be seen from FIG. 9 that the peripheral surface (side surface) of the ferrule 41, excluding the portion of the gap 45, is closed by the semicircular portions 54 and 55.

Accordingly, by supplying dry air, for example, from the penetration hole 58 in the upper die 52 as indicated by a downwardly-pointing arrow in FIG. 8 at a certain pressure, the air enters the communication passage 48 via the gap 45 as indicated by a rightwardly-pointing arrow. The air further passes through the space where the end surface 42 of the ferrule 41 and the spherical lens 37 confront each other, and then enters the communication passage 49 as indicated by a leftwardly-pointing arrow. The air from the communication passage 49 then enters the penetration hole 59 in the lower die 53 via the gap 45, and is exhausted outside the mold 51 as indicated by a downwardly-pointing arrow.

It is of course possible to enable the supply of dry air from the penetration hole 58 in the upper die 52 and use a vacuum pump or the like to suck the dry air from the penetration hole 59 in the lower die 53. However, it is possible to obtain a higher internal pressure in the passages within the mold 51 by supplying pressurized dry air from the penetration hole 58 in the upper die 52 by use of a pump or the like.

In the above state where the dry air is supplied to the mold 51, the melted resin, such as an epoxy resin, is supplied to the mold 51 via the cutout portion 61. However, unlike the conventional case describe above, the volatile gas generated from the melted resin cannot easily enter the space between the end surface 42 of the ferrule 41 (that is, the end surface of the optical fiber 36) and the spherical lens 37 which confront each other. The volatile gas which does reach the space between the end surface 42 and the spherical lens 37 is immediately exhausted outside the mold 51 via the communication path described above. For this reason, it is possible to effectively prevent fine particles of the volatile gas from adhering on the surfaces of the optical fiber 36 and the spherical lens 37, and thus prevent a thin film from being formed on these surfaces when the volatile gas solidifies. A ventilation using clean dry air is generally easier to realize for the purposes of exhausting the volatile gas, but it is of course possible to use other gasses such as nitrogen gas. The gas used for the ventilation is desirably a non-volatile gas.

Figure 10A:
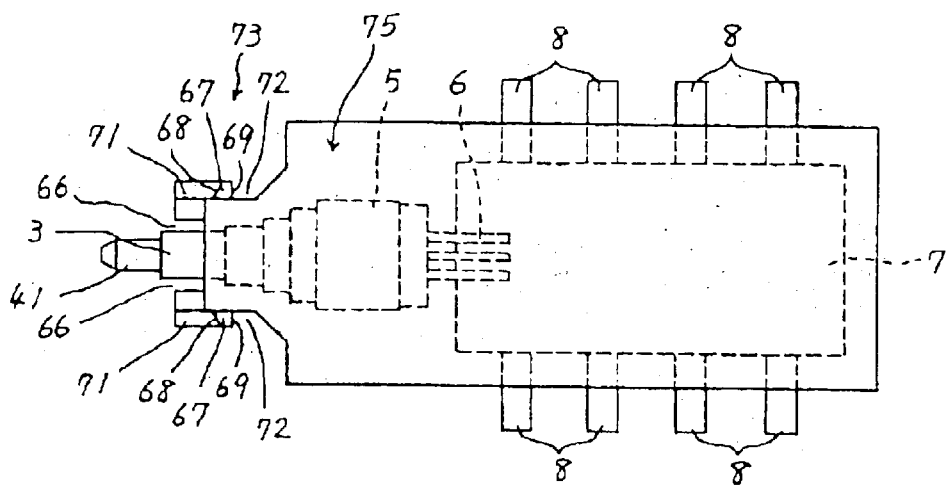
FIGS. 10A, 10B and 10C respectively are a plan view, a side view and a front view showing the first embodiment of the optical module.
Figure 10B:
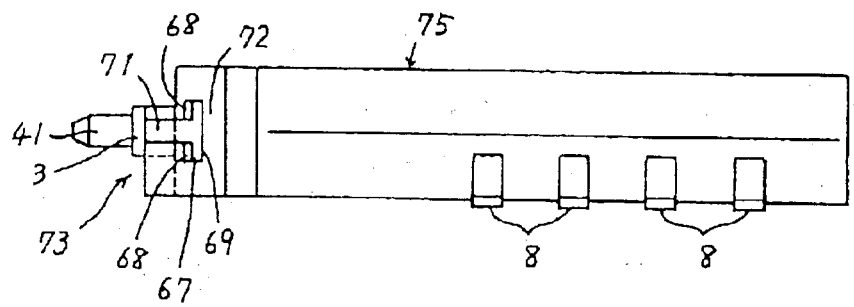
Figure 10C:
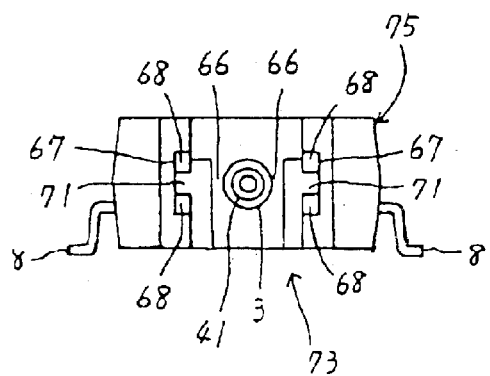

After cooling and curing of the resin, the upper and lower dies 52 and 53 of the mold 51 are separated to obtain a completed optical module 65. FIGS. 10A, 10B and 10C respectively are a plan view, a side view and a front view showing the optical module 65, that is, the first embodiment of the optical module.

In the optical module 65, the tip end of the ferrule 41 and the tip end of the first cylindrical member 3 project to the left in FIGS. 10A and 10B. In addition, as shown in FIGS. 10A and 10C, a pair of engaging portions 67 is provided on both sides of the first cylindrical member 3 via spaces 66. The engaging portion 67 includes sloping surfaces 68 on the left in FIG. 10A, engaging surfaces 69 perpendicular to the axis direction on the right in FIG. 10A, flat guide portions 71 on the left of the sloping surface and extending horizontally in FIG. 10A, and constricted portions 72 on the right of the engaging surfaces 69 in FIG. 10A. A connector section 73 of the optical module 65 is formed by these elements of the engaging portions 67. This connector section 73 is integrally molded from a synthetic resin.

The space 66 is provided on both sides of the first cylindrical member 3 because of the need for the surfaces of the semicircular portions 56 and 57 of the upper and lower dies 52 and 53 of the mold 51 to sandwich the first cylindrical member 3, so as to contact and hold the first cylindrical member 3.

In FIG. 10A, the terminals 6 of the optical device 5 are connected to the circuit board 7 at a portion indicated by a dotted line on the right of a synthetic resin molded portion 75. In addition, the terminals 8 on both sides of the circuit board 7 extend outside from the portion indicated by the dotted line.

Figure 11:
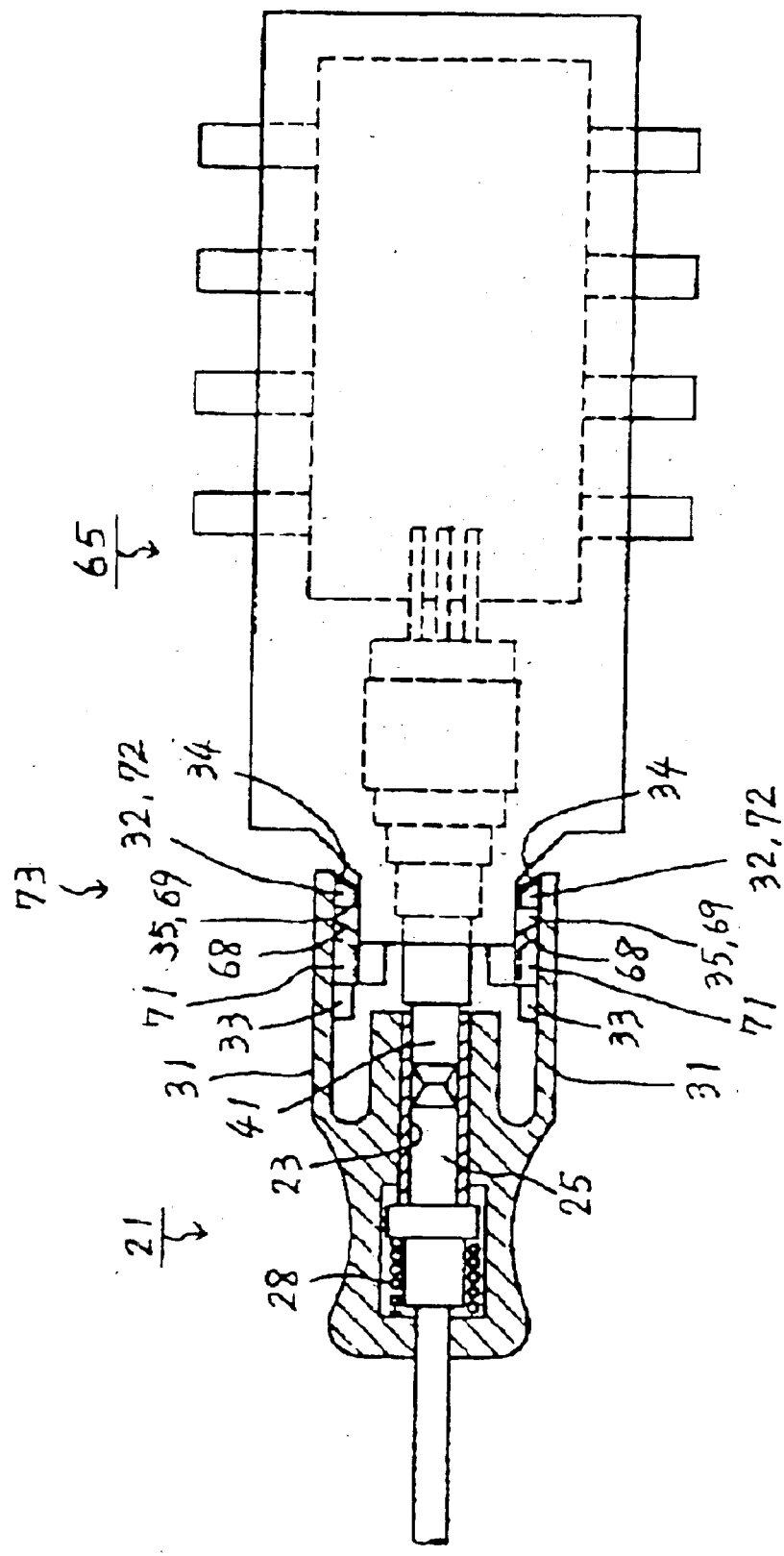
FIG. 11 is a plan view for explaining a connection of the optical module and an optical connector, with the optical connector shown in cross section.

FIG. 11 is a plan view for explaining a connection of the optical module 65 and the optical connector 21, with the optical connector 21 shown in cross section. When connecting the optical connector 21 described above in conjunction with FIGS. 2A and 2B to the connector section 73 of the optical module 65 in a state shown in FIG. 11, the connection can be achieved as described above in conjunction with FIGS. 3A and 3B.

In other words, the optical connector 21 is pushed so that the guide portions 71 fit into the intermediate spaces of the upper and lower engaging projections 32. Hence, the sloping surfaces 68 and 34 contact each other, and the engaging leaf springs 31 of the optical connector 21 are spread on both sides against the spring force by this contact. As a result, the engaging projections 32 fit into the constricted portions 72 of the connector section 73 as shown in FIG. 11, and the engaging leaf springs 31 are restored to their original states by the spring force.

During the above process, the tip end of the ferrule 41 fits into the cylindrically coiled spring 24 against the spring force of the cylindrically coiled spring 24. Hence, the tip end of the ferrule 41 is positioned to the central position of the cylindrically coiled spring 24, and the center of the tip end of the ferrule 41 matches the center of the tip end of the ferrule 25 of the optical connector 21. Furthermore, since the tip end of the ferrule 41 moves while compressing the compressed coil spring 28, the tip end of the ferrule 25 is pushed against the tip end of the ferrule 2 by the action of the compressed coil spring 28, to thereby realize a positive optical connection between the ferrules 41 and 25.

In addition, the guide portions 71 of the optical module 65 and the guide portions 33 of the optical connector 21 engage each other to maintain the optical module 65 and the optical connector 21 in a stable connected position. The engaging surfaces 35 of the optical connector 21 contact and engage the engaging surfaces 69 of the optical module 65, so as to positively prevent the optical module 65 and the optical connector 21 from slipping off from each other, and to provide the required optical coupling.

When disconnecting the optical module 65 and the optical connector 21, the engaging projection 32 on the tip ends of the engaging leaf springs 31 are spread with respect to the connector section 73 of the optical module 65, and the optical connector 21 is then pulled from the optical module 65. Since the optical connector 21 is small, the engaging leaf springs 31 may be spread by use of an exclusive spreading jig.

The provision of the flat surfaces 43 at symmetrical positions of the ferrule 41 also results in secondary effects, in that it is possible to eliminate eccentric error when press-fitting the ferrule 41 into the first cylindrical member 3 and it is possible to eliminate a rotary positional error caused by expansion and contraction depending on a temperature change thereafter.

Figure 12A:
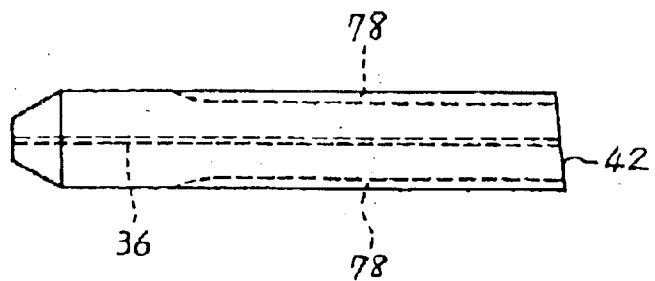
FIGS. 12A, 12B and 12C respectively are a side view, an end view and a plan view showing a ferrule of a second embodiment of the optical module according to the present invention.
Figure 12B:
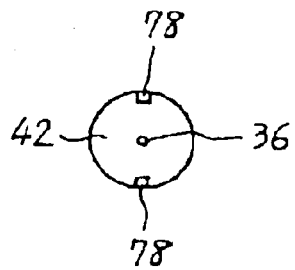
Figure 12C:
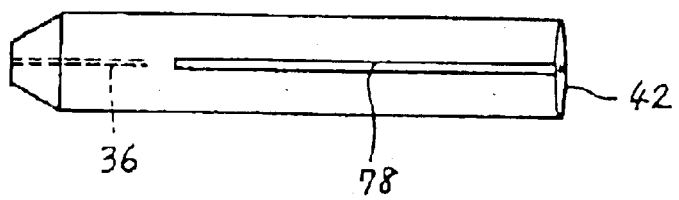

FIGS. 12A, 12B and 12C respectively are a side view, an end view and a plan view showing a ferrule of a second embodiment of the optical module according to the present invention. More particularly, FIG. 12B shows the end view of a ferrule 77 shown in FIG. 12A, and FIG. 12C shows the plan view of the ferrule 77 shown in FIG. 12A. The ferrule 77 has a cylindrical shape and is made of zirconia ceramics. An optical fiber 36 penetrates the ferrule 77 in an axis direction thereof, and end surfaces of the optical fiber 36 are exposed at respective end surfaces of the ferrule 77, as shown in FIGS. 12A and 12C. A pair of grooves 78 are provided at symmetrical positions on both sides of the ferrule 77, between an end surface 42 on the inner side of the ferrule 77 and an intermediate position towards a tip end on the outer side of the ferrule 77, as shown in FIGS. 12A and 12B.

When assembling the ferrule 77 and the optical device 5, the assembling can be made similarly as described above in conjunction with FIGS. 6 through 9, by replacing the ferrule 41 shown in FIG. 6 by the ferrule 77. Substantially the same effects can be obtained as in the case of the first embodiment described above. In other words, the ferrule 77 is press-fit into the first cylindrical member 3 and held therein, but in this second embodiment, a gap 45 is formed between the tip end surface of the first cylindrical member 3 and the tip end portion of each groove 78 of the ferrule 77. Since each gap 45 communicates with the corresponding groove 78, communication passages 48 and 49 similar to those of the first embodiment are formed by the grooves 78 and the inner peripheral surface of the first cylindrical member 3.

Compared to the ferrule 41 of the first embodiment, the contact area of the ferrule 77 with the inner peripheral surface of the first cylindrical member 3 is larger. In addition, since the ferrule 77 and the inner peripheral surface of the first cylindrical member 3 are in continuous contact, only with the exception of the portions corresponding to the grooves 78, the ferrule 77 can be held stably and positively by the first cylindrical member 3.

Figure 13A:
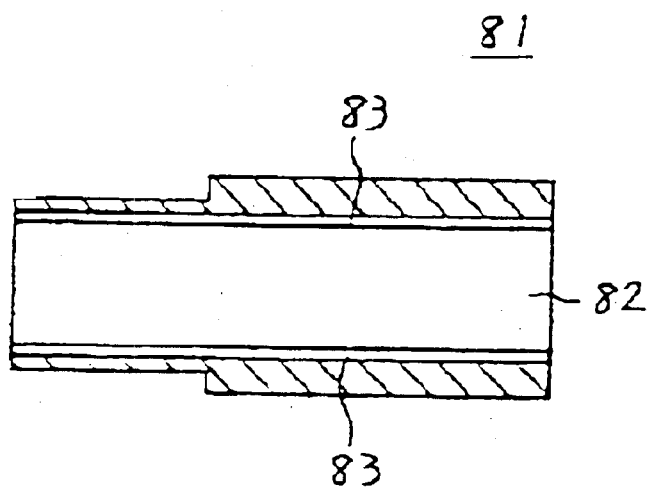
FIGS. 13A and 13B respectively are a cross sectional view and an end view showing a first cylindrical member of a third embodiment of the optical module according to the present invention.
Figure 13B:
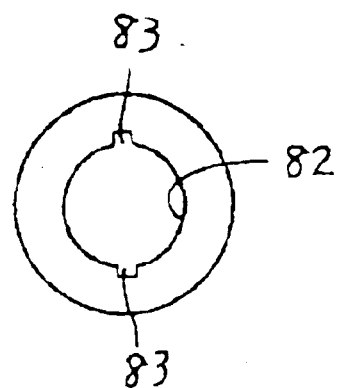

FIGS. 13A and 13B respectively are a cross sectional view and an end view showing a first cylindrical member of a third embodiment of the optical module according to the present invention. More particularly, FIG. 13A shows the cross sectional side view of a first cylindrical member 81, and FIG. 13B shows the end view on the inner side of the first cylindrical member 81. The basic shape and dimensions of the first cylindrical member 81 are the same as those of the first cylindrical member 3 shown in FIG. 2. But in the first cylindrical member 81, grooves 83 are provided at symmetrical positions in an inner peripheral surface 82 of the first cylindrical member 81 along the axis direction.

Figure 14:
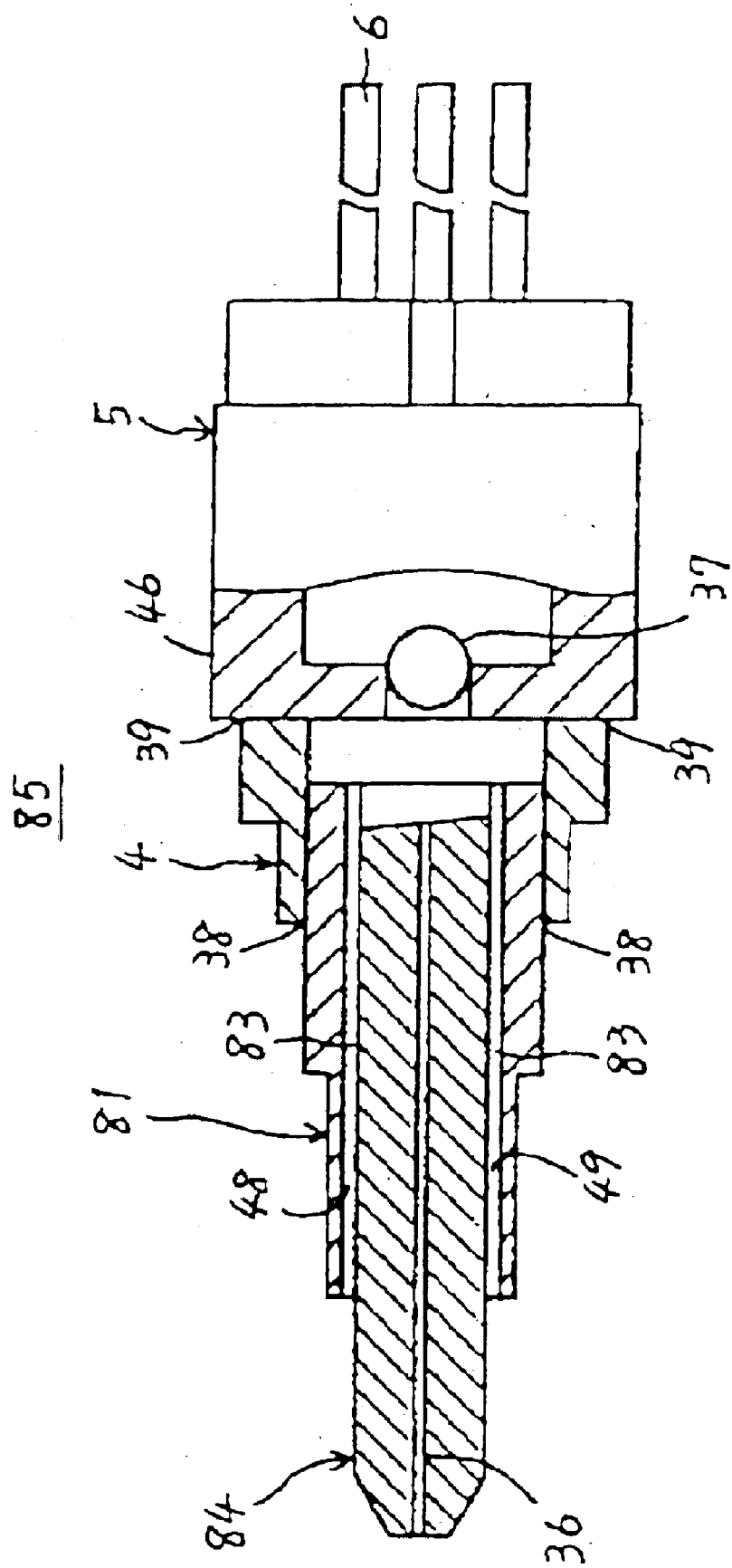
FIG. 14 is a cross sectional view for explaining assembling of the first cylindrical member shown in FIGS. 13A and 13B and an optical device.

FIG. 14 is a cross sectional view for explaining assembling of the first cylindrical member 81 shown in FIGS. 13A and 13B and the optical device 5. A ferrule 84 which is press-fit into the first cylindrical member 81 has a simple rod shape having no flat surfaces 43 or grooves 78 as in the case of the ferrules 41 and 77 of the first and second embodiments described above.

In FIG. 14, the ferrule 84 is press-fit into the first cylindrical member 81 and positioned therein at a predetermined position. The first cylindrical member 81 is press-fit into the second cylindrical member 4.

The end surface of the second cylindrical member 4 contacts and connects to the end surface of the sealed container 46 of the optical device 5. The laser diode (LD, not shown) is provided as an optical element at a central bottom portion on the right end of the sealed container 46 in FIG. 14. A light transmitting window is provided in the sealed container 46 at a position confronting the optical fiber 36 which is provided at the center of the ferrule 84. The spherical lens 37 which forms a light transmitting optical system is mounted at the light transmitting window maintaining the sealed state of the sealed container 46 of the optical device 5.

Each of the above described elements can be assembled into an assembly 85, similarly as described above with reference to FIG. 6, and a description of the assembling for this third embodiment will be omitted.

In the assembly 85 which is assembled, independent communication passages 48 and 49 which are closed by the grooves 83, are formed in the axis direction at symmetrical positions, between the periphery of the ferrule 84 and the inner surface of the first cylindrical member 81. A communication path which extends from one tip end surface of the first cylindrical member 81 to the other tip end surface of the first cylindrical member 81 via a space between the optical fiber 36 and the spherical lens 37 which confront each other, is formed via the communication passages 48 and 49.

Thereafter, the circuit board 7 is electrically connected to the above described assembly 85, and the assembly 85 is placed in the cavity within the mold 51, as described above in conjunction with FIGS. 7 through 9.

When molding the resin within the mold 51 by supplying the melted resin, gas is supplied from the penetration hole 58 in the upper die 52 and ejected from the penetration hole 59 in the lower die 53, via the communication passages 48 and 49. Hence, it is possible to obtain the same effects as those obtained by the above described embodiments. In addition, this third embodiment has an additional advantage in that the ferrule 84 which is made of ceramics, for example, may have the simple rod shape.

The provision of the grooves 83 at symmetrical positions of the first cylindrical member 81 also results in secondary effects, in that it is possible to eliminate eccentric error when press-fitting the ferrule 84 into the first cylindrical member 81 and it is possible to eliminate a rotary positional error caused by expansion and contraction depending on a temperature change thereafter.

Although the optical module of the embodiments described above is provided with a light emitting element, the present invention is of course applicable to an optical module provided with a light receiving element. In addition, the light transmitting optical system is not limited to a spherical lens, and the light transmitting optical system may simply be a transparent window for transmitting light, for example. In addition, only the important parts of the mold are shown in the embodiments, but other parts of the mold must of course be appropriately designed within the knowledge of those skilled in the art to achieve the desired results described in the embodiments.

The optical connector 21 is of course not limited to the EZ type optical connector, and the present invention is applicable to optical modules which are connectable to any easily-detachable optical connector or, to any optical connector which is connected to the optical module by screws.

Further, the present invention is not limited to these embodiments, but various variations and modifications may be made without departing from the scope of the present invention.

What is claimed is:

1. An optical module comprising:
   a ferrule, an optical fiber which penetrates a center thereof along an axis direction of the ferrule;
   a member inserted with the ferrule;
   a sealed container, connected to the member, having an optical system which optically couples to the optical fiber;
   a resin portion encapsulating the member and the seated container; and
   a communication path including a first communication passage between the ferrule and the member, a space where the optical system and the optical fiber confront each other, and a second communication passage between the ferrule and the member, said first and second communication passages being mutually independent, wherein
   the first and second communication passages are provided in at least one of the ferrule and the member,
   the ferrule and the member respectively have a cylindrical shape, so that an outer peripheral surface of the ferrule contacts an inner peripheral surface of the member, and
   the ferrule has flat surfaces extending in the axis direction in a portion of the outer peripheral surface thereof, and the first and second communication passages are defined by the flat surfaces and the inner peripheral surface of the member.

2. An optical module comprising:
   a ferrule, an optical fiber which penetrates a center thereof along an axis direction of the ferrule;
   a member inserted with the ferrule;
   a sealed container, connected to the member, having an optical system which optically couples to the optical fiber;
   a resin portion encapsulating the member and the sealed container; and
   a communication path including a first communication passage between the ferrule and the member, a space where the optical system and the optical fiber confront each other, and a second communication passage between the ferrule and the member, said first and second communication passages being mutually independent, wherein
   the first and second communication passages are provided in at least one of the ferrule and the member,
   the ferrule and the member respectively have a cylindrical shape, so that an outer peripheral surface of the ferrule contacts an inner peripheral surface of the member, and
   the ferrule has grooves extending in the axis direction in a portion of the outer peripheral surface thereof, and the first and second communication passages are defined by the grooves and the inner peripheral surface of the member.

3. An optical module producing method for producing an optical module which is provided with a ferrule an optical fiber which penetrates a center thereof along an axis direction of the ferrule, a member inserted with the ferrule, a sealed container connected to the member and having an optical system which optically couples to the optical fiber, a resin portion encapsulating the member and the sealed container, and a communication path including a first communication passage between the ferrule and the member, a space where the optical system and the optical fiber confront each other, and a second communication passage between the ferrule and the member, said first and second communication passages being mutually independent, said optical module producing method comprising the step of:

(a) placing at least the ferrule and the member within a mold; and (b) supplying a gas to the first communication passage and exhausting the gas from the second communication passage when supplying melted resin into the mold to form the resin portion.

4. The optical module producing method as claimed in claim 3, wherein said step (b) supplies pressurized dry air to the first communication passage.

5. The optical module producing method as claimed in claim 3, wherein the mold includes a first hole and a second hole, and said step (b) supplies the gas to the first communication passage via the first hole, and exhausts the gas from the second communication passage via the second hole.

* * * * *

UNITED STATES PATENT AND TRADEMARK OFFICE
CERTIFICATE OF CORRECTION

PATENT NO. : 6,722,794 B2
DATED : April 20, 2004
INVENTOR(S) : Akitoshi Mesaki

It is certified that error appears in the above-identified patent and that said Letters Patent is hereby corrected as shown below:

Column 12,
Line 21, change "seated" to -- sealed --.

Signed and Sealed this

Thirtieth Day of November, 2004

JON W. DUDAS
*Director of the United States Patent and Trademark Office*